United States Patent [19]

Mowatt-Larssen

[11] Patent Number: 5,168,717
[45] Date of Patent: Dec. 8, 1992

[54] $CO_2$ COOLED RAILCAR

[75] Inventor: Erling Mowatt-Larssen, Valparaiso, Ind.

[73] Assignee: General American Transportation Corporation, Chicago, Ill.

[21] Appl. No.: 791,419

[22] Filed: Nov. 13, 1991

[51] Int. Cl.$^5$ ............................................. B60H 1/32
[52] U.S. Cl. ...................................... 62/239; 62/385; 62/388; 454/90
[58] Field of Search ................. 62/384, 385, 388, 239; 165/56; 454/90; 248/60

[56] References Cited

U.S. PATENT DOCUMENTS

| | | | |
|---|---|---|---|
| 1,935,923 | 11/1933 | Thoke | 62/91.5 |
| 3,292,887 | 12/1966 | Cassel et al. | 248/60 |
| 3,673,812 | 7/1972 | Pierce | 454/90 X |
| 4,553,403 | 11/1985 | Taylor | 62/239 |
| 4,593,536 | 6/1986 | Fink et al. | 62/239 |
| 4,704,876 | 11/1987 | Hill | 62/388 |
| 4,761,969 | 8/1988 | Moe | 62/388 |
| 4,891,954 | 1/1990 | Thomsen | 62/239 |
| 4,951,479 | 8/1990 | Araquistain et al. | 62/239 |

FOREIGN PATENT DOCUMENTS 399678 11/1933 United Kingdom .

OTHER PUBLICATIONS

CRYX 1000 Cryogenic Railcar, made, sold and delivered in this Country on or before Feb. 7, 1986.
CRYX 1223 Cryogenic Railcar, made and used in this Country by Sep., 1990.

Primary Examiner—William E. Tapolcai

[57] ABSTRACT

A refrigerated railcar having a bunker for holding $CO_2$ snow generated by a spray manifold temporarily hooked up to a supply of liquid $CO_2$, the bunker allowing the gaseous $CO_2$ sublimated from the formed snow to pass down through vents and into an improved underfloor flow channeled floor which provides a maze-like structure to cool an underside of the cargo. Additionally, an improved insulated manifold pipe hanger is described. Additionally, an improvement in the venting arrangement of the bunker area and an improved configuration of the manifold orifices to provide a more evenly deposited snow thickness throughout the bunker during charging is described.

26 Claims, 9 Drawing Sheets

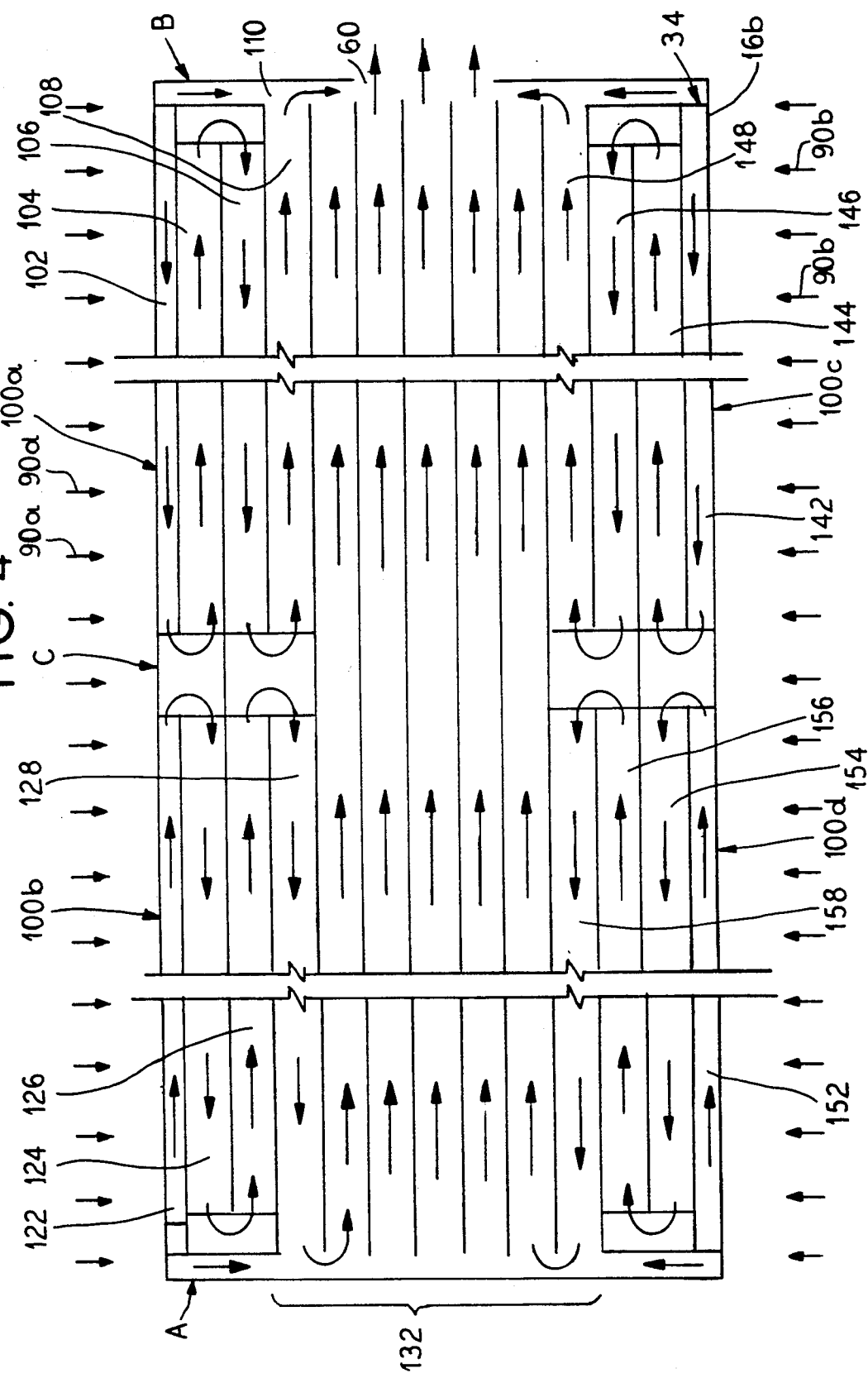

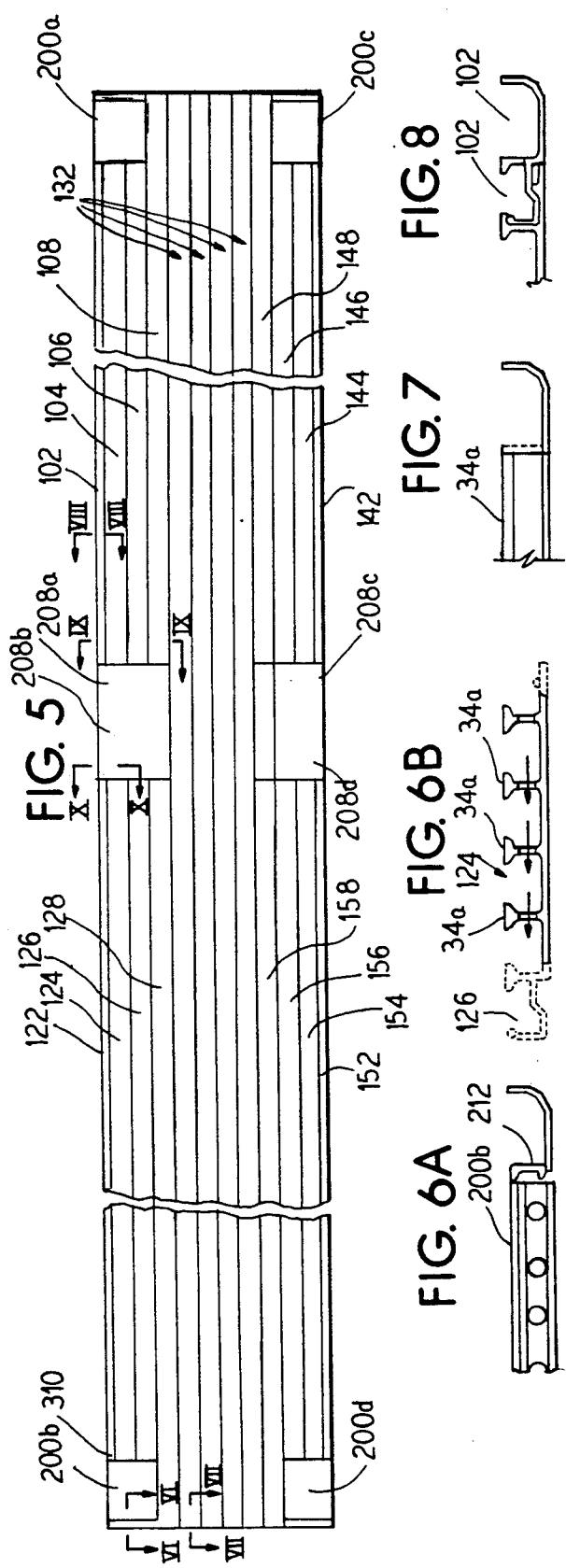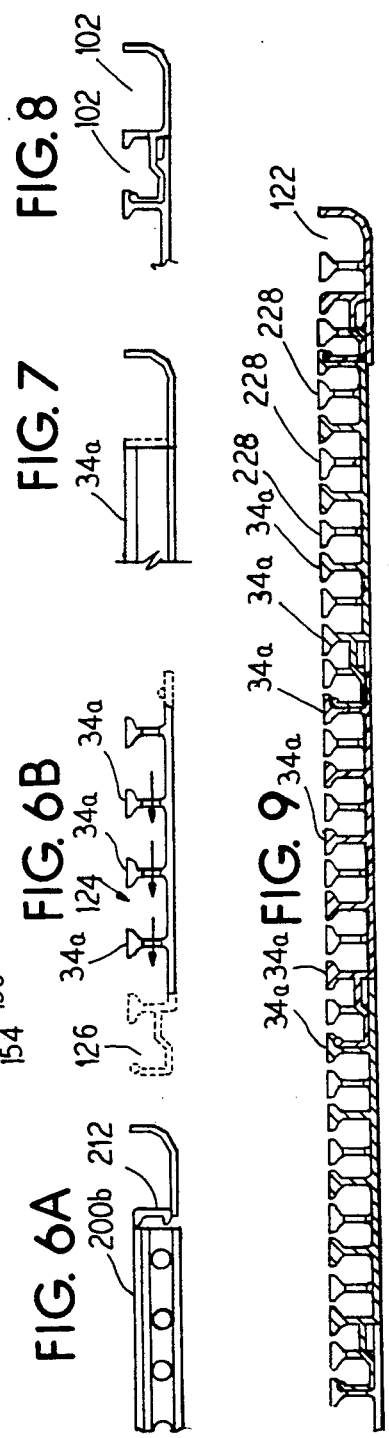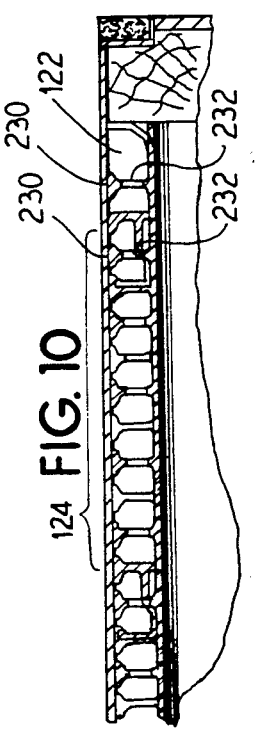

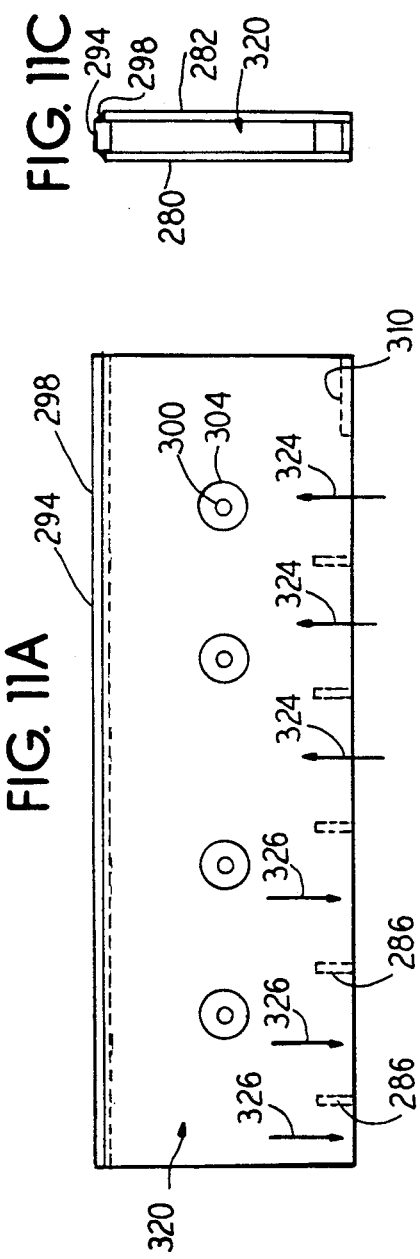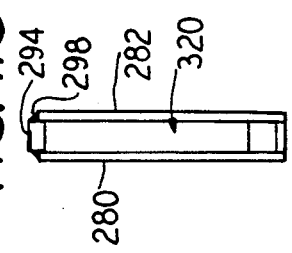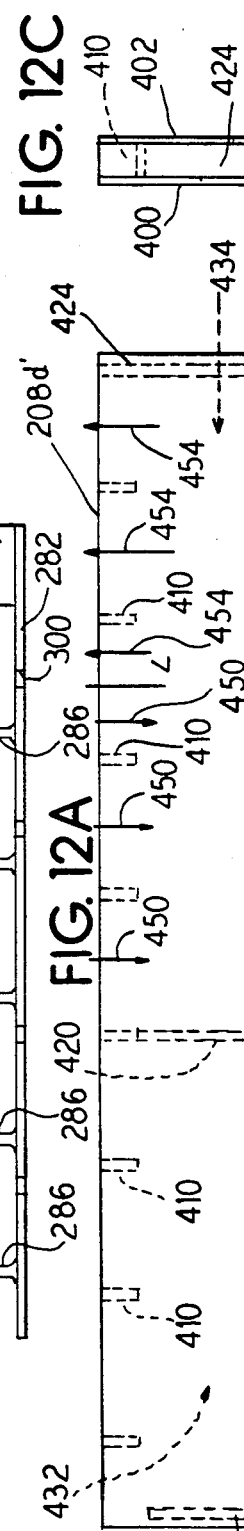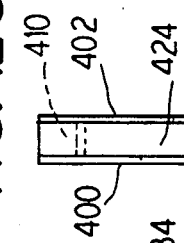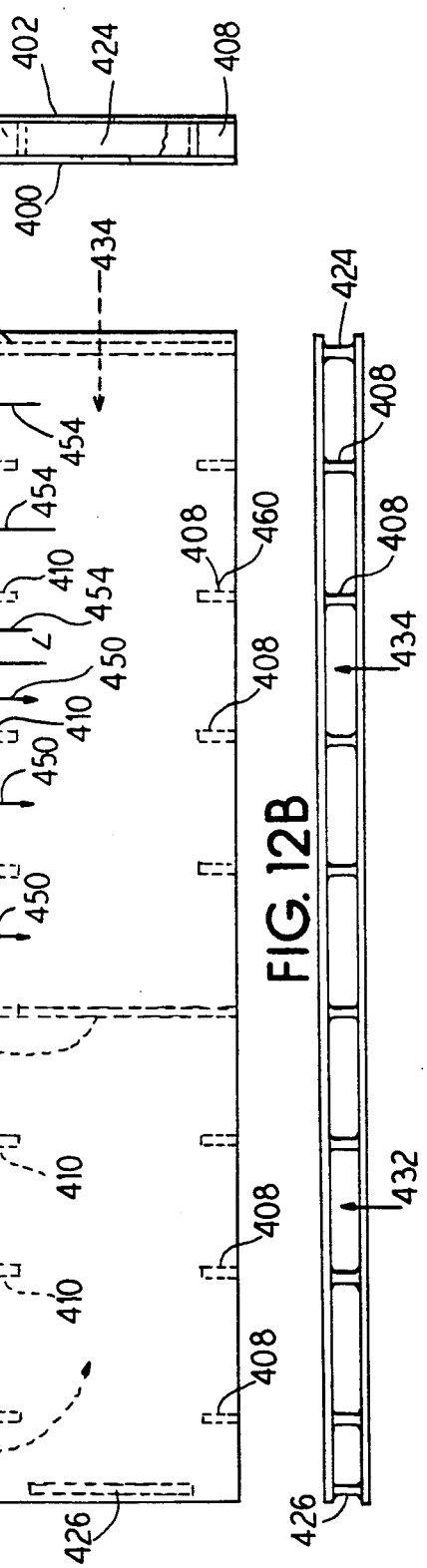

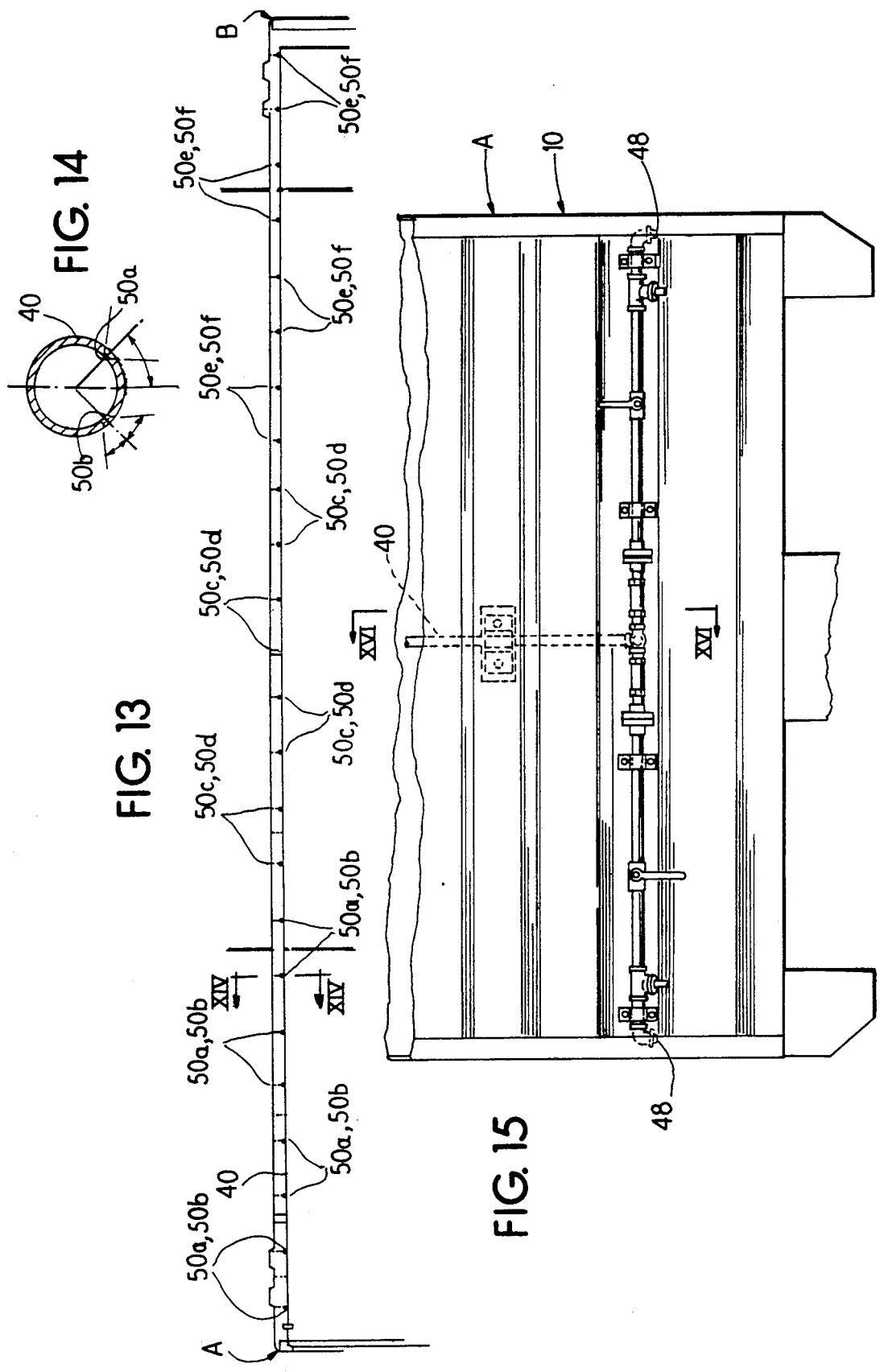

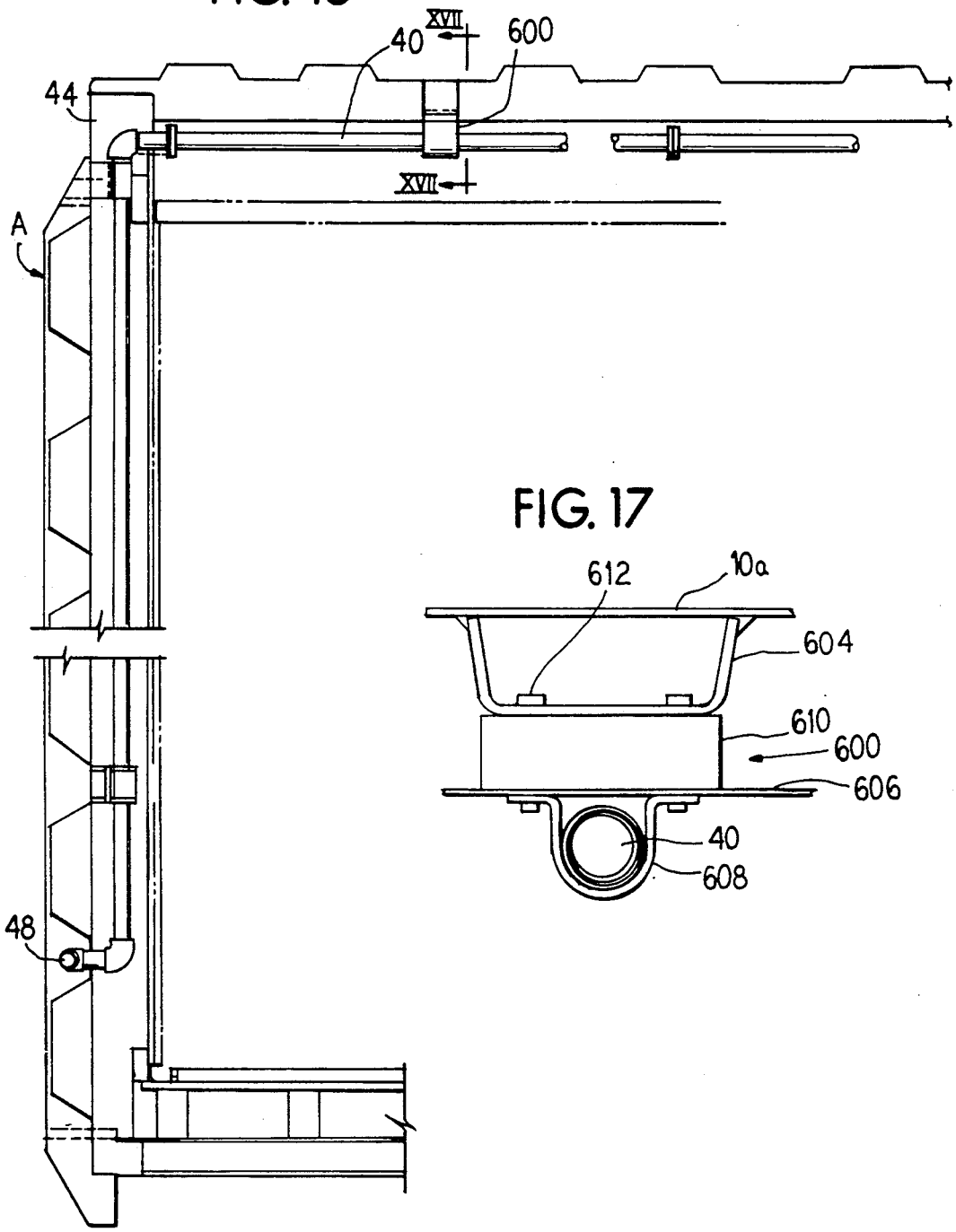

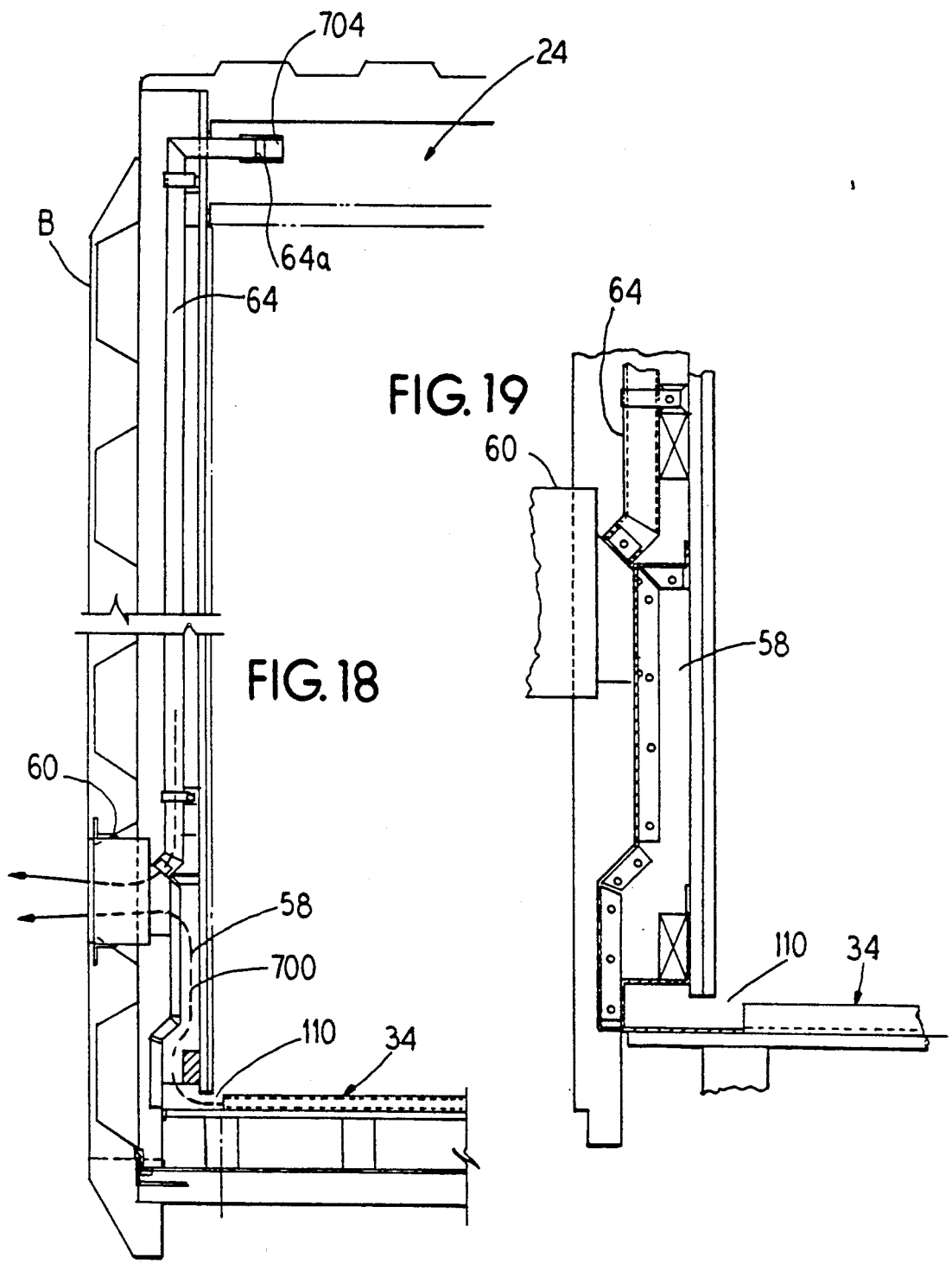

$CO_2$ COOLED RAILCAR

BACKGROUND OF THE INVENTION

The present invention relates to a refrigeration system for containers, particularly for railroad box cars. Such railcars, sometimes referred to as "reefers", are used to transport fresh or frozen foods in a cold or frozen state. This invention particularly relates to using $CO_2$ snow to keep the cargo cold by placing the $CO_2$ snow in an attic or bunker located above the cargo area of the container and providing vents through the bunker to allow the $CO_2$ gas generated by the sublimation of the $CO_2$ snow to fall downwardly into the cargo area to cool the load.

Cryogenically cooled box cars have been disclosed in U.S. Pat. Nos. 4,891,954; 4,704,876; 4,593,536; 4,761,969; and British Pat. No. 399,678. In all of these patents, $CO_2$ in solid form is located above the cargo area in a bunker wherein the sublimated $CO_2$ gas is allowed to fall downwardly into the cargo area to cool the load.

The '954 and '876, '536 and '969 patents all disclose corrugated floors to allow the downwardly flowing $CO_2$ gas to proceed beneath the load to ensure cooling. The latter named three patents also disclose corrugated walls for providing a vertical pathway for the downward flowing $CO_2$ gas to flow between the cargo and the walls to reach the floor.

SUMMARY OF THE INVENTION

It is an object of the present invention to provide an improved container for holding a cargo in a refrigerated condition employing $CO_2$ snow located in an overhead bunker.

It is an object of the invention to provide a refrigerated railroad box car which maintains the load at a desirable cold temperature and which maintains such cold temperature consistently throughout the load.

It is an object of the present invention to provide an underfloor $CO_2$ gas circulation system which helps to counter heat infiltration through susceptible areas such as the door joints of the box car.

It is an object of the present invention to provide a bunker area relief venting system which is easily manufactured and compact.

It is an object of the present invention to provide a $CO_2$ liquid distribution header or manifold which effects an even distribution of $CO_2$ snow throughout the length of the bunker area, which is easily and inexpensively manufactured and is relatively clog-free.

It is an object of the present invention to provide a bunker vent arrangement which allows for the effective movement of $CO_2$ gas down from the bunker area into the cargo area to cause effective cooling by both a permeation effect and a surrounding of the load to be cooled.

It is an object of the present invention to provide an effective $CO_2$ cooling system from supply to venting, including a manifold pipe distribution system, bunker floor vent system, side and end wall corrugated channels, and terminating in the under floor ducting system which insures cooling all around the load and proper venting of $CO_2$ vapor out of the container.

A further object of the invention is to provide a novel mechanism for attaching the manifold pipe along the length of the bunker which inhibits heat transfer into the bunker area through the pipe support.

To accomplish the above and other objectives, the present invention utilizes a bunker in the upper region of a container where $CO_2$ snow is deposited. The bunker overlies the cargo area, and has a bunker floor formed with vents along opposite lengthwise side walls, and vents spaced along a center line of the container, the center line vents approaching but not necessarily adjacent the end walls for providing a surrounding of the cargo at both side walls. The cargo height is kept short of contact with the overhead bunker floor to create an open space across the top of the cargo (typically stacked boxes of frozen food). This space serves as a dispersement chamber located between the bunker floor and top of the cargo stacked thereunder for distributing the cold $CO_2$ gas where needed.

From the dispersement chamber the cold $CO_2$ gas is dispersed horizontally and downward through openings between cartons of the cargo and between the cartons and the side walls. In transit, heat infiltration will occur through the insulated walls, ceiling, floor, and door seals. When an increase in temperature occurs, the warm air will rise into the dispersement chamber above the load and in turn cause $CO_2$ in the bunker to convert to $CO_2$ gas through sublimation. The sublimated heavy $CO_2$ gas will gravity flow through the bunker floor vents into the dispersement chamber above the load. From this chamber the cold gas will flow horizontally and downward between the load cartons, between the cartons and the walls and to the open rib flooring to displace the warmer air and keep the temperature of the load consistent in temperature, usually sub-zero.

At the floor level, a unique gas flow pattern is designed for the open rib-flooring. By first channeling the flash gas in a back-and-forth serpentine fashion from each side wall extending to the middle third of the floor before discharging the flash gas through an end vent door, overall, underfloor cooling is enhanced. This circulatory system forces the $CO_2$ gas to circulate underneath a closed floor plate at the side door opening where the highest heat infiltration will occur. With the use of manifolds, the $CO_2$ gas is first channeled in a serpentine fashion into a channel region occupying the middle third of the floor, after which it is channeled directly by the open-rib floor to the exit vent-door.

This serpentine pattern passes the $CO_2$ gas from the side walls by dividing the floor into four quadrants wherein in each quadrant the gas flows from an end of the car towards the center, is turned around toward the end again at the center of the container, is once again turned toward the center of the car at the end of the car, and once again turned toward the opposite end of the car from the center of the car, where the gas proceeds into the central group of channels which proceed directly from the closed end of the car toward the vented end of the car.

The invention further provides an improved manifold pipe for flashing $CO_2$ liquid into $CO_2$ snow inside the bunker area. The manifold pipe has located spaced along its length a plurality of orifice pairs. Each pair of orifices has two orifices, aimed downwardly at the bunker floor at a 45° angle from the vertical, the orifice pairs aimed at 90° with respect to each other. The orifices are sized in three groups along a length of the manifold pipe such that smaller orifices are present near to the supply side of the manifold pipe and progressively increasing groups of orifice sizes are used toward the capped side or the dead end side of the manifold pipe. By so sizing the orifices a more even delivery of $CO_2$ snow is provided for by compensating for liquid pressure drops from the supply side to the capped side.

A flash gas vent and pressure relieving system is provided. When the liquid $CO_2$ is first flashed up inside the bunker area, some solid $CO_2$ is created and a great volume of $CO_2$ gas is generated. During this "charging", sufficient venting must be provided so as not to overpressure the bunker area or the car. Normally, the openings or vents through the bunker floor down into the cargo area is satisfactory for relieving this charging $CO_2$ gas. However, as a precaution, a relief vent duct is provided from the bunker area down to the vent-door exit. A rupture disk is provided in this relief duct which, upon sensing a overpressure in the bunker area will rupture to relieve the gas out through the vent exit.

The invention also provides a novel mechanism for hanging the manifold pipe in the bunker area. Specially designed pipe hangers are utilized which provide a heat transfer stop between the attachment to the structure of the container roof and the clamp which holds the pipe. The heat transfer stop is composed of an insulator such as a polyfoam block or other heat transfer resistant material.

In a preferred embodiment of the invention, the container of the cryogenic refrigeration system is a railroad boxcar.

BRIEF DESCRIPTION OF THE DRAWINGS

FIG. 4 is a schematical plan view of the floor of the railcar of FIG. 1;

FIG. 5 is a plan view of the channel floor of the railcar of FIG. 1 in more detail;

FIG. 6A is a sectional view taken generally along VI—VI of FIG. 5;

FIG. 6B is an elevational view taken through the section of FIG. 6A.

FIG. 7 is a sectional view taken generally along VII—VII of FIG. 5;

FIG. 8 is a sectional view taken generally along VIII—VIII of FIG. 5;

FIG. 9 is a sectional view taken generally along IX—IX of FIG. 5;

FIG. 10 is a sectional view taken generally along X—X of FIG. 5;

FIG. 11A is a plan view of an alternate cross over duct;

FIG. 11B is an elevational view of the cross over duct of FIG. 11A;

FIG. 11C is a side elevational view of the cross over duct of FIG. 11A.

FIG. 12A is a plan view of an alternate center cross over duct;

FIG. 12B is an elevational view of the cross over duct of FIG. 12A;

FIG. 12C is a side elevational view of the cross over duct of FIG. 12A;

FIG. 13 is an elevational view showing the manifold pipe in the railcar and locations of the $CO_2$ orifices;

FIG. 14 is a sectional view taken generally along lines XIV—XIV of FIG. 13;

FIG. 15 is a partial side elevational view taken of the manifold pipe fill end of the railcar;

FIG. 16 is a sectional view taken generally along XVI—XVI of FIG. 15, also showing a pipe hanger of the present invention;

FIG. 17 is a sectional view taken generally along XVII—XVII of FIG. 16.

FIG. 18 is a sectional view of the vent door end of the railcar; and

FIG. 19 is a partial enlarged view taken from FIG. 18.

DETAILED DESCRIPTION OF THE PREFERRED EMBODIMENTS

Figure 1:
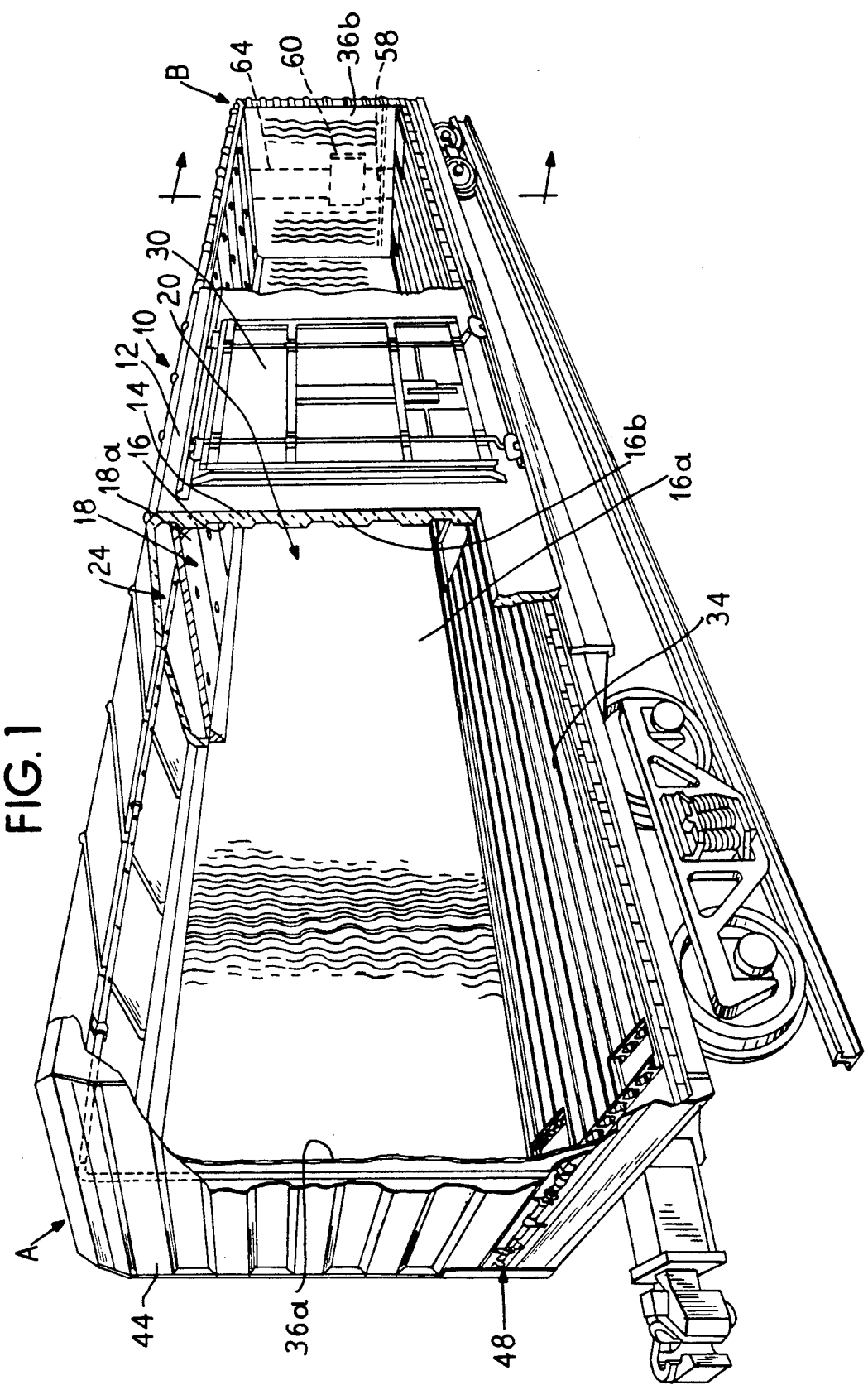
FIG. 1 is a perspective view partly broken away of a refrigerated railcar incorporating the present invention.

FIG. 1 shows a refrigerated railcar or box car 10 which utilizes the present invention. The railcar is preferably a Plate F-sized box car. The box car 10 comprises an outer shell 12, insulation 14 and inside paneling 16. A sliding door 30 is provided centrally on at least one side wall of the railcar as is known. A false ceiling or bunker floor 18 is provided to divide the inside of the box car 10 into a cargo compartment 20 and a bunker area 24. The bunker floor 18 comprises individual panels 18a arranged side-to-side of an inside of the box car 10 and supported on lengthwise ledges 26. The ledges 26 can be of a plurality of designs including L brackets or triangular cut timbers as shown.

The paneling 16 extends from at least the bunker floor 18 down to a channeled floor 34. The paneling 16 includes side walls 16a, 16b and end walls 36a, 36b. The side walls and end walls comprise corrugated fiberglass panels forming rows of sinuous or straight channels 38, open sided toward the interior of the container. Sinuous channeling is preferred because is prevents a straight corner of a box from inadvertently filling the channel and blocking off flow through the channel, and because a sinuous pattern provides an elongated flow length from top to bottom of the car. This elongated flow length aids in heat transfer. U.S. Pat. No. 3,206,946 discloses such paneling.

The floor 34 comprises lengthwise channeling providing flow space underneath the cargo. The floor can be a T-type cross sectional shape or variations thereof with the flat head portion of the T supporting the cargo thereabove. As will be described hereinafter, the channeled flooring 34 is selectively blocked and bypassed in certain portions to provide a serpentine flow of $CO_2$ gas therethrough.

Railroad cars are generally described as having an "A" end and a "B" end, with the B end being the end having the brake.

Above the bunker floor 18 and spanning a length of the container is a manifold pipe 40. The manifold pipe 40 proceeds into the A wall of the railcar 44 and extends downwardly to emerge on the outside to provide fill nozzles 48 on an outside of the car. The manifold pipe 40 serves to conduct a supply of liquid $CO_2$ into the bunker area 24. Discharge of the liquid $CO_2$ from the manifold pipe into the bunker area creates a condition called flashing, wherein the liquid $CO_2$ is converted to solid form, known as snow, and deposited onto the bunker floor 18.

Along the length of the manifold pipe 40 are located orifice holes 50a, 50b arranged together in pairs and aimed downwardly at 45° from the vertical as will be described hereinafter.

At the B end of the car, the channeled floor 34 opens in its central portion into a vent duct 58 which exits into a vent box 60 which provides an exit for gases to the outside. A relief duct 64 is provided for relieving the bunker area 34 of vent gas downwardly into the vent box 60 for removal from the car. The relief duct 64 and the vent duct 58 are located behind the end wall siding 36b.

Figure 2:
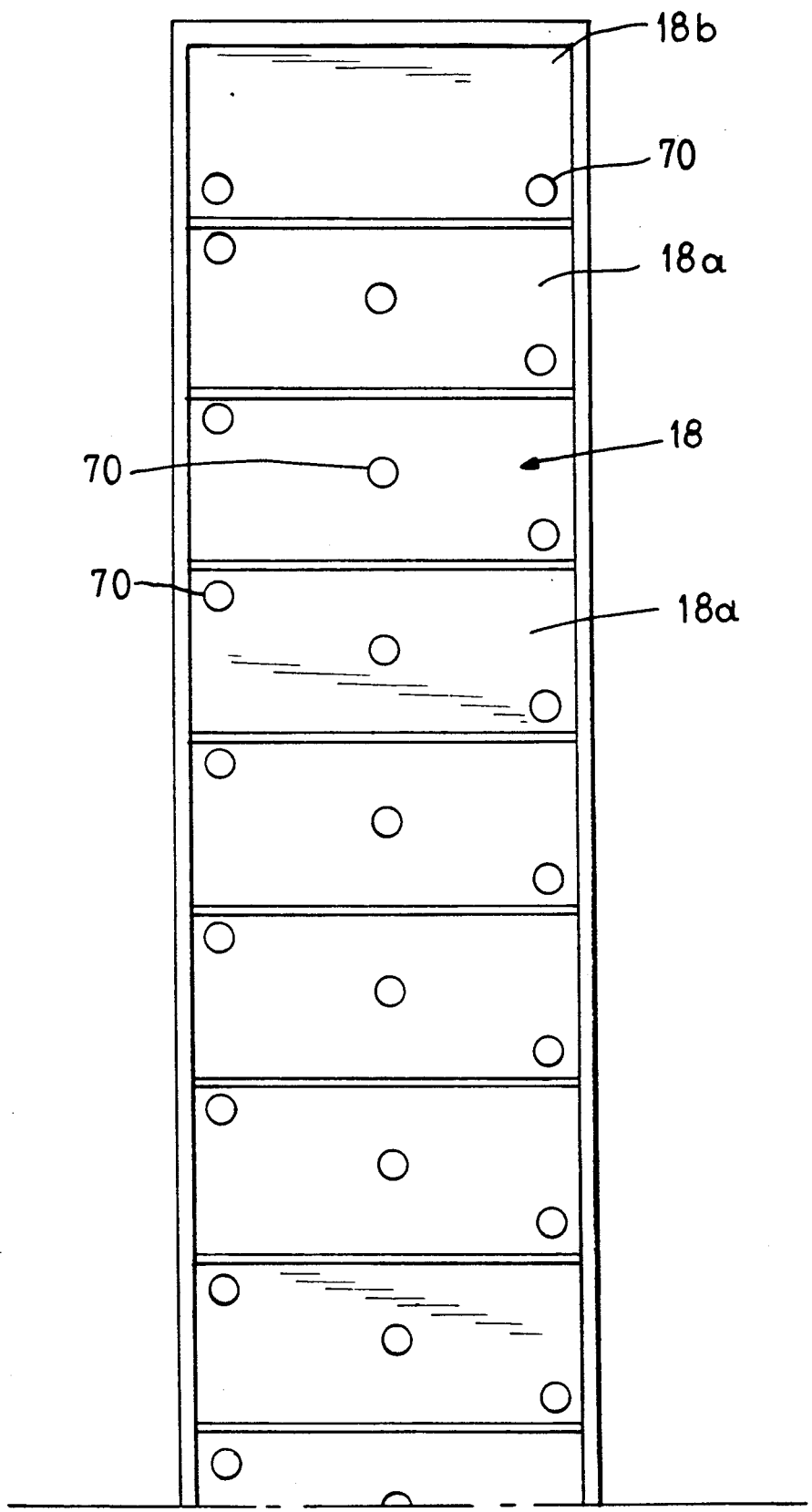
FIG. 2 is a half-length plan view of the bunker floor of the railcar of FIG. 1, showing schematically the location of vent holes in the bunker floor.

FIG. 2 shows the vent opening arrangement through the bunker floor 18 for each panel 18a. The end panels will be referred to as 18b. All of the panels 18a, except for the end panels 18b, are formed with a diagonally aligned array of three vent holes 70. By lining up the panels 18a during installation into the car, it can be seen that such an arrangement provides for vent holes 70 to be arranged adjacent to each side wall with no vent holes 70 being directly opposite a corresponding vent hole on an opposite side of the panel 18a. Vent holes 70 located along the car's center line provide $CO_2$ gas directly downward upon the load into a dispersement chamber 72 formed as a deliberate open space between cargo 74 and the bunker floor 18 (see FIG. 3). The vent holes 70 are disposed along linear paths between, but short of adjacent, the end walls 36a, 36b.

Figure 3:
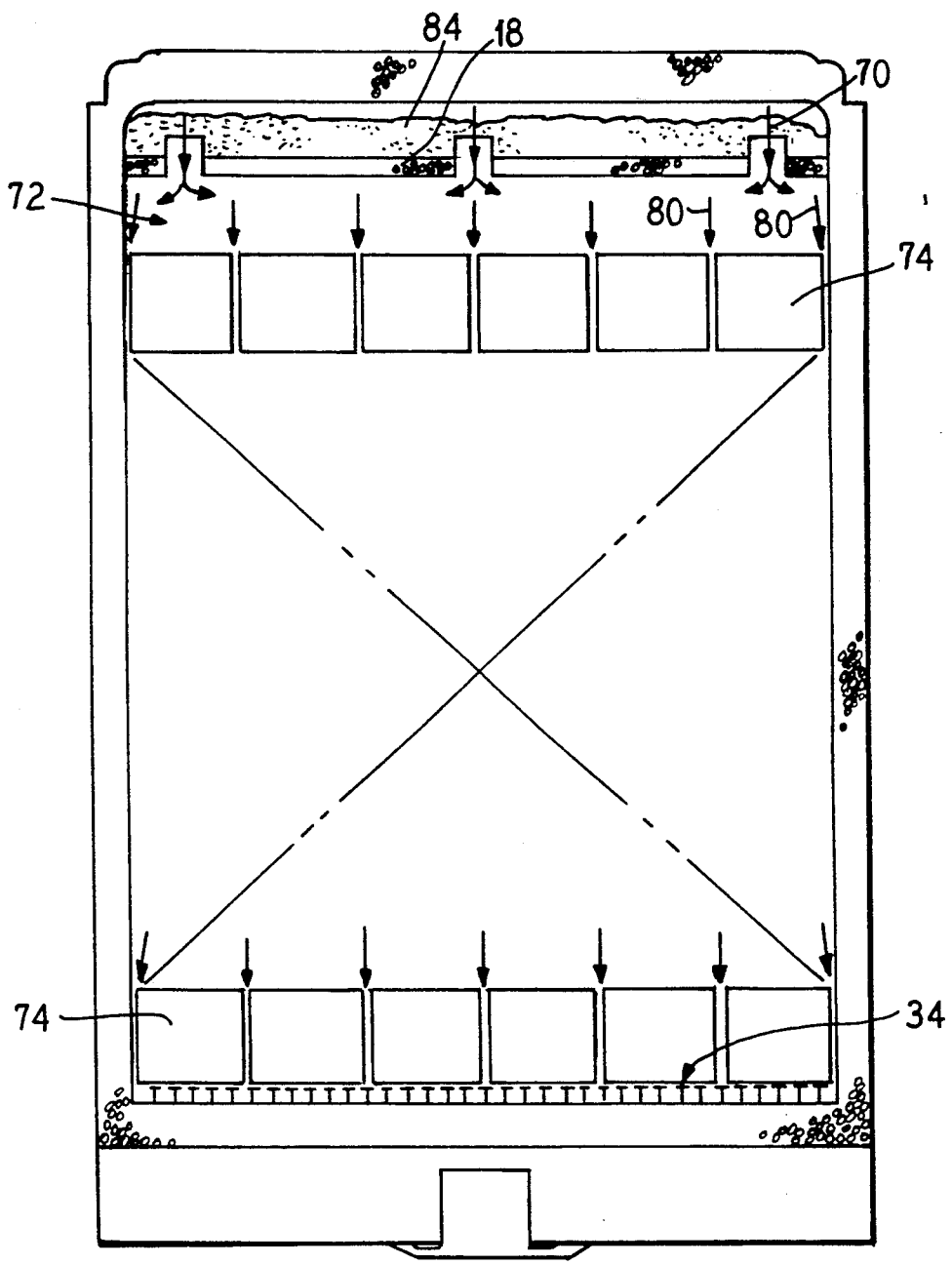
FIG. 3 is a sectional view of the railcar of FIG. 1, across its width, showing schematically the flow arrangement of sublimated $CO_2$ gas.

FIG. 3 shows in schematic fashion the flow of $CO_2$ gas from the bunker area 24, through the bunker vents 70, down into the dispersement chamber 72. The bunker vents 70 are shown to also comprise stand pipes 76 for stiffening the vent opening and also for preventing $CO_2$ solid snow from proceeding down through the bunker vent 70. A screen can be provided on top of the stand pipe 76. As can be demonstrated by arrows 80, the flow of $CO_2$ gas from the sublimating $CO_2$ snow 84 located on top of the bunker floor 18 permeates down through the cartons 74. Some of the $CO_2$ gas surrounds the cartons and some passes downward through the cracks and crevices between cartons. Thus, both permeation and encapsulation is accomplished.

FIG. 4 shows the inventive arrangement of the floor 34 which provides for increased cooling effect. Rows of arrows 90a, 90b represent the $CO_2$ gas which proceeds by gravity downwardly from the vents 70 through the channels 38 in walls 16a, 16b. The $CO_2$ gas flowing down each side wall 16a, 16b is divided into two flow paths at floor level, so that a total of four flow paths are developed for the $CO_2$ gas flowing down the side walls 16a, 16b. Flow quadrants are formed marked generally 100a, 100b, 100c, and 100d.

Starting with flow quadrant 100a, $CO_2$ gas proceeding down the side wall 16a from one half the length of side wall 16a, proceeds into an adjacent channel 102 and all of the gas cumulatively proceeds down this channel 102 toward a center of the car C. The gas, as indicated by the flow arrows, turns around at the center C and is directed to a first group of channels 104 for flowing toward the B end of the car. Once approaching the B end of the car, this gas flow is turned around and directed back again toward the center C of the car through a second group of channels 106. Once again reaching the center C of the car, this gas flow is turned around once again toward the B end of the car through a third group of channels 108. Once reaching the B end of the car, it enters a plenum channel or plenum 110 which runs widthwise of the car at the B end and opens into the vent duct 58 and out of the car.

The quadrant 100c are arranged similarly to the first quadrant 100a, except in a mirror image fashion across the lengthwise center line of the car viewing the flow in plan. The quadrant 100b and 100d are arranged similarly to the quadrants 100b and 100c respectively, except in respective mirror image fashion across the width-wise centerline of the car.

The second quadrant, 100b, operates in mirror image flow fashion to the first quadrant 100a across a widthwise center line at the center C of the car. The flow of $CO_2$ gas in the second quadrant 100b proceeds into an adjacent channel 122 where it proceeds toward the center C, is turned around and is carried by a first group of channels 124 toward the A end, once at the A end it is turned around again and proceeds toward the center through a second group of channels 126, once at the center the flow is turned around again through a third group of channels 128 toward the A end of the car, where it is turned around once more and proceeds through a central group of channels 132 which proceed directly from the A end to the B end for removal from the car through the vent duct 58.

The third quadrant, 100c, proceeds as follows. $CO_2$ gas flowing down the side wall 16b is collected in an adjacent channel 142 which proceeds from the B end toward the center C of the car where it is turned around and directed through a first group of channels 144 toward the B end of the car. Once at the B end of the car, the flow is turned around toward the center of the car through a second group of channels 146. Once at the center, the flow is turned around again toward the B end of the car through a third group of channels 148. Once at the B end of the car the flow flows into the plenum 110 for eventual removal from the car through the vent duct 58.

The flow through the fourth quadrant 100b proceeds as follows. The flow from the side wall 16b enters an adjacent channel 152 where it proceeds from the A end toward the center C of the car. Once at the center C of the car, it is turned around through a first group of channels 154 toward the A end of the car. Once at the A end of the car, the flow is turned around toward the center of the car through a second group of channels 156. Once at the center of the car, the flow is turned around again through a third group of channels 158 toward the A end of the car. Once at the A end of the car the flow is turned around toward the B end of the car through the central group of channels 132 for eventual removal from the car through the vent duct 58.

Thus, it can be seen that the present arrangement provides for increase of flow capacity of the side wall flow of $CO_2$ gas. Unlike a floor channel arrangement such as disclosed in U.S. Pat. No. 4,704,876, the flow down each side wall is broken into two flow paths, e.g., half of the total flow down side wall 16a proceed through adjacent channel 102 and the second half of the flow proceeds through adjacent channel 122. Additionally, the serpentine torturous path provides for more flow at the central part C of the car, especially the outside central part where one third of the flow (looking widthwise of the car) is forced to circulate back and forth near the doorway. Since the $CO_2$ gas, as it accepts heat from the load or due to infiltration, warms up as it progresses through its under floor flow path to finally seek exit through the vent duct 58, by providing a torturous path nearto the side walls the coldest part of the gas flow is used where it makes the most effect, that is, near the side walls and near the places for entry of warm air, near to the door. Thereby, the warmest of the floor flowing $CO_2$ gas actually proceeds beneath the central part of the cargo wherein the cooling requirement is somewhat less.

FIG. 5 shows the floor plan in somewhat more detail. The floor 34 is made up of what is referred to as 10 inch boards which each comprise approximately five channels, in a standard board. The adjacent channels 102, 122, 142, 152 to the side walls comprise each a single channel or an extra channel can be arranged in parallel with the adjacent channels flow for more flow capacity.

Located at corners of the container are corner cross over ducts 200a, 200b, 200c and 200d. These cross over ducts are passages which permit the "turning around" of the gas from one direction to another direction. Located centrally of the car are center cross over ducts 208a, 208b, 208c, 208d. These central cross over ducts serve the same function as the corner cross over ducts by permitting the flow to make a 180° turn to effect the serpentine configuration of the underfloor flow pattern.

FIG. 6A shows the configuration of the corner cross over duct 200b, wherein lengthwise flow along the channel is blocked by vertical member 212 and lateral flow from the first channels 124 to the second channels 126 is accomplished by drilled holes 216 through webs of the T extrusions forming the channel members. This construction would be typical for all of the corner cross over ducts 200a, 200b, 200c, 200d.

FIG. 6B shows the holes 216 drilled through a plurality of the rail members 34a to allow for the lateral movement of gas from for example the first group of channels 124 to the second group of channels 126.

FIGS. 7 and 8 show the floor channel configuration at the A end wall wherein the vertical member 212 is removed (as compared to FIG. 6A) so that the A end terminal end of the central groups of channels 132 are open to each other for manifolding and distributing the flow through all of these central channels.

FIG. 9 shows the arrangement through the central cross over duct 208b, wherein cross over ribs 228 are provided offset from the floor board ribs 34a.

FIG. 10 shows the adjacent channel 122 and the first group of channels 124 communicating flow into each other through the central cross over 208b having ribs 230 with holes 232 drilled therethrough. A mirror image construction is utilized for the central cross over 208d, mirror image across the lengthwise center line of the car. A mirror image construction is utilized for central cross over 208a, mirror image across the widthwise center line of the car. A mirror image construction of the arrangement according to 208d would be utilized for the central cross over 208c, mirror image with respect to the widthwise center line of the car.

Following this logic, corner cross over 200a would be constructed in mirror image fashion to corner cross over 200b, mirror image with respect to the widthwise center line of the car. Cross over 200c would be a mirror image construction of cross over 200d, mirror image with respect to the widthwise center line of the car. Cross over 200b would be a mirror image of cross over 200d with respect to the lengthwise center line of the car. Cross over 200a would be the mirror image construction of cross over 200c with respect to the lengthwise center line of the car.

FIGS. 11A, B and C depict an alternate embodiment of the cross over duct 200b, designated 200b'. Thus, instead of the ribbed configuration underneath the cover plate wherein holes are drilled through the ribs, this duct provides more expansive and open flow paths between channels. For simplicity, please refer to FIG. 11a, 11b and 11c simultaneously. The duct 200b' comprises a top plate 280 and a bottom plate 282. The top plate 280 and the bottom plate 282 are fashioned spaced apart and one on top of another by a plurality of ribs 286 at a front face 290 and a plate member 294 at a back face 298. A plurality of small holes 300 are drilled through the bottom plate 282 aligned coaxially with large holes 304 cut through the top plate 280. The holes are intended for fasteners to attach the corner cross over duct to the bottom surface of the railroad car. The large hole 304 is meant to provide an amount of adjustability for positioning the corner cross over duct to the floor and attaching thereto. A block out plate 310 is provided at the front face 290 of the corner cross over duct. The block out plate 310 is shown functionally in FIG. 5 to close off the flow toward the A end in the adjacent channel 122. By providing this block out plate 310 as an integral part of the corner cross over duct, a simplicity in manufacturing is achieved. In fact, by providing the entire corner cross over duct as an integral shop manufactured piece, assembly of the floor can be achieved economically as compared to having to field drill the plurality of holes as shown in FIGS. 6a, 6b. The corner cross over duct 200b' provides between the top plate 280 and the bottom plate 282 a mixing and turn around volume 320 where the flow can make the 180° turnaround as indicated by the flow arrows 324 representing the $CO_2$ gas flow into the cross over duct 200b' from the first group of channels 124, and the flow arrows 326 representing the $CO_2$ flow out of the cross over duct and into the second group of channels 126 toward the center of the car C.

The plates 286 are made to appropriately align with the ribs 34a of the floor abutting the front side 290 of the corner cross over duct 200b'.

FIG. 12A, 12B, and 12C show an alternate embodiment to the center cross over duct 208d, designated as 208d'. In this embodiment, the ribbed configuration of the center cross over duct such as shown in FIG. 10, has been replaced by a preassembled cross over duct which alleviates the need to make drilled through holes between ribs of the floor. This preassembled component-type cross over duct need only be set in place abutting a shortened end of the conventional ribbed floor. The cross over duct 208d' will now be described in more detail with regard to the three FIGS. 12a, 12b and 12c.

The center cross over duct 208d' comprises a top cover 400 and a bottom plate 402. The top cover 400 and the bottom plate 402 are fastened together in overlying, sandwiched, spaced apart fashion by first series of gusset plates 408 on a side of the cross over duct nearest to the center of the car and a second series of gusset plates 410 on a side of this particular cross over toward the A end of the car. The first series of gusset plates 408 proceed along a length of the cross over duct in spaced apart fashion. The second series of gusset plates 410 are substantially aligned across a width of the cross over duct with the first series of gusset plates 408. A first flow dividing wall 420 extends across this width of the cross over duct, and a second flow wall 424 extends across a width of the cross over duct spaced from the first wall. A structural plate 426 extends across a partial width of the gusset plate, adjacent the side wall 16b. Between the top cover 400 and the bottom plate 402 is a first flow mixing and turn around volume 432 and a second flow mixing and turn around volume 434, the two mixing volumes separated by the first wall 420. Flow from the adjacent channel 152 proceeds into the first flow mixing chamber 432 as indicated by the flow arrow 440. Flow mixes and turns around in the flow mixing area 432 and exits as shown by the flow arrows 442 into the first group of channels 154. On the other side of the first wall 420, flow enters the cross over duct in a direction shown by the arrows 450 from the second group of channels 156 and mixes in the second flow mixing and turn around volume 434 and exits in a direction shown by the arrows 454 into the group of channels 158. The second wall 424 prevents mixing of this latter flow with the flow moving through the central group of channels 132 which is adjacent to the second wall 424 (see FIG. 4).

It is to be noted that the central cross over duct 208d' is not closed at a back face 460. However, because this central cross over duct will be back-to-back to the cross over duct 208c or alternatively 208c', there is no need to close the flow between these two cross over ducts. The cross over duct 208c', will be a mirror image of the cross over duct 208d' and the flow rates should be substantially similar. Therefore, by having this open face 460, the flows will actually be relatively equally balanced and the net quantity of flow as described with respect to FIG. 12 will be accurate. For example, some element of the flow indicated by flow arrow 440 can theoretically proceed not in accordance with arrow 442, but out the backside 460 and into the second group of channels 144 in quadrant 100c. However, according to a balanced flow, an equal amount of flow may proceed from quadrant 100c to this quadrant 100d. Thus, the system is self balancing so that there is no need to structurally and physically separate the cross over duct 208d' from the cross over duct 208c', and cross over duct 208b' from cross over duct 208a', In fact, leaving these cross over ducts somewhat in communication for flow will result in a more balanced system in case of any unusual heat incursion in a particular adjacent quadrant.

FIG. 13 shows the invention's manifold pipe 40 having drilled orifices 50a, 50b in pairs located spaced along a length of the manifold pipe 40. Additionally, the manifold pipe provides a varying size of the orifices featuring increasing diameter of the orifices as the manifold pipe 40 proceeds from the fill side (A side) of the car to the capped end 40b. The first group of orifices 50a, 50b extend from the A side approximately one-third of the length of the railroad car, wherein a second group of orifices 50c, 50d proceed in spaced out fashion for the next third of the length of the railcar to where a third set 50e, 50f proceed to the end 40b of the manifold pipe. As a preferred embodiment for an approximately 70 foot railroad car, eight pairs of orifices 50a, 50b having inner diameter 0.076 inches are provided spaced out for the first third of the length; the second set of orifices 50c, 50d comprise eight sets spaced across the second third of the length of the car and have an inner diameter of 0.081 inches; and the third set of orifices 50e, 50f comprise eight sets spaced along the last third of the length of the manifold pipe and have an inner diameter of 0.086 inches.

FIG. 14 shows that each pair of orifices such as 50a, 50b are aimed downwardly at 45° from the vertical apart from each other, and that each orifice is beveled expanding outwardly from its minimum diameter at a 30° flair. Because the orifices are flared to open up, plugging or freezing up of the orifices are reduced.

FIG. 15 shows the piping manifold 40 proceeding through the A side wall 44 downwardly to fill connections 48.

FIGS. 16 and 17 show the invention mechanism for hanging the manifold pipe 40, wherein a U-shaped bracket 604 is welded to a steel structure 10a of the roof of the car 10. Bolted to this U bracket 604 is a plate 606 which abuts a U clamp 608 which holds the manifold pipe 40. Between the plate 606 and the U bracket 604 is a piece of insulating barrier 610 which prevents heat gain from the car 10 through the bracket and to the manifold pipe, which results in heat entry into the car. Some long studs 612 hold the insulating barrier, plate 606 and clamp 608 to the U bracket 604 in sandwich fashion.

FIGS. 18 and 19 show at the B end of the car the ducting for removing $CO_2$ vapors from the floor 34 to outside the car 10. The vent duct 60 is shown as a folded rectangular duct which communicates for flow with the plenum 110. Flow as indicated by the arrow 700 exits the plenum 110 and moves upwardly through the vent duct 58 to the vent box 60 and exits the car 10. Also shown feeding into the vent box 60 is the relief vent 64 which terminates at a upward end inside the bunker area 24. A rupture disk 704 is provided at this upward end 64a which is designated to rupture upon overpressure of the bunker area to relieve $CO_2$ gas down through the relief duct 64 and out of the car through the vent box 60.

Although the present invention has been described with reference to a specific embodiment, those of skill in the art will recognize that changes may be made thereto without departing from the scope and spirit of the invention as set forth in the appended claims.

I claim as my invention:

1. In a container for maintaining cargo in a refrigerated condition, the container having a top, opposed side walls and end walls, a bottom, and a bunker area beneath the top and above a cargo volume and substantially coterminous therewith, the bunker area having a plurality of vents through a floor of the bunker area into the cargo area, the container providing in the bunker area a manifold pipe for spraying liquid $CO_2$ and forming $CO_2$ snow on a floor of the bunker, the improvement comprising:

providing a channeled floor surface for holding the cargo thereon, the channeled floor surface providing a serpentine flow arrangement beneath the cargo, wherein the flow arrangement comprises four flow quadrants, each flow quadrant receiving substantially one fourth of the $CO_2$ gas induced from the bunker into the cargo area and each flow quadrant having at least three changes in direction in the plane of the floor, before exiting the container.

2. The improvement of claim 1, wherein the channeled floor provides a vent at a first end of the floor for removal of $CO_2$ gases flowing through the floor; and said channeled floor provides a central group of channels which proceed substantially from a second end of said car to said first end of said car; and each said quadrant delivers its flow into said central group of channels.

3. The improvement according to claim 2, wherein each quadrant is arranged having a feed channel adjacent to a side wall of said car, and each said feed channel receives $CO_2$ flow from said side wall there adjacent, each said feed channel receiving substantially one fourth of the $CO_2$ flow down the side walls, and each said feed channel channeling said flow towards the center of the container.

4. The improvement according to claim 1, wherein said vents through said bunker floor are arranged along the opposed side walls and the center of the bunker floor in linear paths between, but short of adjacent, the end walls.

5. The improvement according to claim 1, wherein said end walls and side walls are corrugated with a sinuous shape.

6. The improvement according to claim 1, wherein one end of said floor is formed with a vent leading to a vent duct turned upwardly from said floor, said vent duct terminating in an outlet to said container.

7. The improvement according to claim 6 further comprising a relief vent flow connected from said bunker area downward to said outlet, said relief vent comprising a means for opening said relief vent when said bunker area experiences an overpressure.

8. The improvement according to claim 7, wherein said means for opening comprises a rupture disk.

9. The improvement according to claim 3, wherein each said quadrant comprises:
- a first set of channels adjacent and coterminous with said feed channel;
- a second set of channels adjacent and coterminous with said first set of channels;
- a third set of channels adjacent and coterminous with said second set of channels;
- a first end cross over duct and a second end cross over duct mounted at opposite ends of said feed channel;
- said first end cross over duct guiding flow from said feed channel to turn 180° into said first set of channels;
- said second cross over duct guiding flow to turn around 180° from said first set of channels into said second set of channels;
- said flow from said second set of channels turned 180° around by said first cross over duct into said third set of flow channels.

10. The improvement according to claim 9, wherein said first set of channels and said second set of channels and said third set of channels each comprise at least two individual flow channels each.

11. The improvement according to claim 10, wherein said first end cross over duct comprises a top plate and a bottom plate separated in sandwich fashion by a series of gusset plates and providing between said top plate and said bottom plate a gas mixing and turn around volume; and
- said first end cross over duct providing a center dividing wall preventing gas from said feed channel from entering said second set of channels from said first end cross over duct.

12. The improvement according to 11, wherein said second end cross over duct provides a top plate and a bottom plate with a volume therebetween for mixing and turn around of said $CO_2$ gas; and
- a back plate mounted between said top plate and bottom plate on a side of said cross over duct opposite to said first set of channels and said second set of channels.

13. The improvement according to claim 1, wherein said manifold pipe provides a plurality of pairs of orifices, said pairs having two orifices drilled through said manifold pipe at 45° angles from the vertical.

14. The improvement according to claim 1, wherein said manifold pipe is mounted to a roof structure of said container by at least one insulated bracket, said insulated bracket comprising:
- an attachment bracket attached to structure of said roof; an insulating barrier attached to a bottom side of said attachment bracket; and
- a U bolt assembly mounted to said bracket sandwiching said insulating barrier therebetween.

15. The improvement according to claim 14, wherein said U bolt assembly comprises a flat plate for abutting a bottom surface of said insulating barrier and said U bolt assembly is mounted to said attachment bracket by at least two long studs.

16. In a container for maintaining cargo in a refrigerated condition, the container having a top, opposed side walls and end walls, a bottom, and a bunker area beneath the top and above a cargo volume and substantially coterminous therewith, the bunker area having a plurality of vents through a floor of the bunker area into the cargo area, the container providing in the bunker area a manifold pipe for spraying liquid $CO_2$ and forming $CO_2$ snow on a floor of the bunker, the improvement comprising: wherein said manifold has a capped end and a plurality of orifices arranged in at least three groups, a first group having a plurality of orifices along the length of said manifold, adjacent the inlet side of said manifold,
- a second group of orifices spaced along said manifold adjacent to said first group, and
- a third group of orifices spaced along said manifold adjacent said second group and adjacent to said capped end of said manifold,
- said first group of orifices having an orifice diameter smaller than said second group of orifices, and said third group of orifices having a diameter greater than said second group of orifices.

17. The improvement according to claim 19, wherein said first set of pairs of orifices comprise drilled diameters of approximately 0.076 inches, and said first group comprises 16 total orifices;
- said second group of pairs of orifices comprise drilled diameters of approximately 0.081 inches, and said second group comprises 16 total orifices; and
- said third group of pairs of orifices comprise drilled diameters of approximately 0.086 inches and said third group comprises 16 total orifices.

18. The improvement according to claim 19, wherein said first group of pairs of orifices are spaced out along the first one third length of said bunker area;
- said second group of pairs of orifices are spaced out along the second one third length of the bunker area; and
- said third group of pairs of orifices are spaced out along the last third length of said bunker area.

19. The improvement according to claim 16, wherein said orifices along the length of said manifold are arranged as a series of transversely spaced apart pairs of orifices.

20. The improvement according to claim 19, wherein each said pair of orifices has two orifices drilled through said manifold pipe at 45° angles from the vertical.

21. A refrigerated railcar having a bottom floor, opposed side walls and end walls, and a roof, at least one said side wall having a centrally disposed door mounted for sliding movement along the exterior of said side wall, at least one said end wall having a vent door, and said railcar having a refrigeration system comprising a bunker area adjacent said roof and substantially coterminous therewith, said bunker area having a floor formed with a plurality of vents therethrough disposed along said side walls and the center of said bunker floor in linear paths between, but short of adjacent, said opposed end walls, and above said bunker floor a manifold pipe extending substantially the length between said end walls for spraying liquid $CO_2$ and forming $CO_2$ snow on said bunker floor, and said bottom floor having channels open upwards toward said bunker floor for supporting a cargo to be refrigerated between said bottom floor channels and said bunker floor vents, said cargo being arranged in said railcar such that a substantial open space is formed between the top of said cargo and the bottom of said bunker floor and bunker floor vents, said open space serving as a dispersement chamber for sublimated $CO_2$ gas flowing from said bunker area through said bunker floor center vents.

22. The refrigerated railcar of claim 21, wherein said bottom floor channels provide a serpentine flow of sublimated $CO_2$ gas beneath said cargo having at least three changes in linear direction with the $CO_2$ gas proceeding from at least one side wall having said door toward the middle of said bottom floor.

23. The refrigerated railcar of claim 21, wherein said manifold pipe provides a plurality of pairs of orifices, said pairs having two orifices drilled through said manifold pipe at 45° angles from the vertical.

24. The refrigerated railcar of claim 21, wherein said manifold has a capped end and a plurality of orifices arranged in at least three groups, a first group having a plurality of orifices along the length of said manifold, adjacent the inlet side of said manifold, a second group of orifices spaced along said manifold adjacent to said first group, and a third group of orifices spaced along said manifold adjacent said second group and adjacent to said capped end of said manifold, said first group of orifices having an orifice diameter smaller than said second group of orifices, and said third group of orifices having a diameter greater than said second group of orifices.

25. The refrigerated railcar of claim 21, further comprising a relief vent flow-connected from said bunker area downward to said vent door, said relief vent comprising a means for opening said relief vent when said bunker area experiences an overpressure.

26. The improvement according to claim 25, wherein said means for opening comprises a rupture disk.

* * * * *